Figure 1:
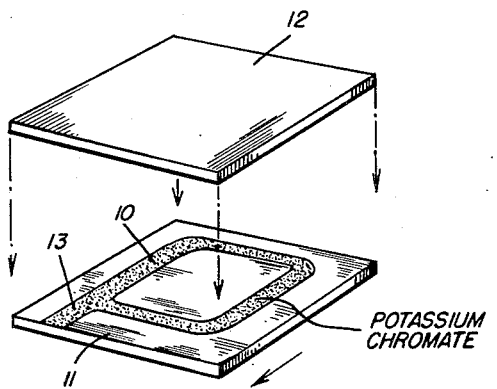

Dec. 4, 1962  S. E. JACK  3,066,390
WELDING OF METAL SHEETS
Filed Dec. 22, 1958

INVENTOR
Stanton E. Jack
BY Robert S. Dunham
ATTORNEY

United States Patent Office 3,066,390
Patented Dec. 4, 1962

3,066,390
WELDING OF METAL SHEETS
Stanton E. Jack, Kingston, Ontario, Canada, assignor to Aluminium Laboratories Limited, Montreal, Quebec, Canada, a corporation of Canada
Filed Dec. 22, 1958, Ser. No. 782,045
Claims priority, application Great Britain Dec. 30, 1957
16 Claims. (Cl. 29—157.3)

This invention relates to the welding of metal sheets wherein mutual welding of the sheets is to be prevented at selected areas. More particularly, the invention is directed to improved methods of fabricating hollow articles by such welding operations with aluminum sheets wherein a stop-weld material is applied in advance at the selected areas, the invention being further directed to a novel composition of stop-weld material and to methods of making the same. As is conventional, the term aluminum is used herein to include aluminum-base alloys.

In the described type of fabricating operation for making hollow articles, as heretofore known, the procedure involves rolling two or more aluminum sheets together so as to bond them to each other over defined areas while preventing such bond or welding at other, selected areas as indicated above. For the latter purpose, a pattern of so-called stop-weld material is applied between the aluminum sheets, i.e. to one or both of the faces to be juxtaposed, such pattern being shaped to define the selected non-binding area, of appropriately contracted dimension or dimensions so as to afford the desired ultimate figure after such elongation as may occur in the sandwich of sheets during the rolling step. The pattern of stop-weld material prevents welding along the selected areas so that in the final, bonded or integral sheet there is an enveloped pattern of non-bonded regions which are thereafter processed, as by fluid pressure, to expand their metal walls for the development of the desired cavities.

Hence after the rolling operation the sheets remain unconnected with each other at the selected, non-welded areas which are ultimately to become the desired passages or spaces in the composite or bonded sheet material, the other parts of which have been coalesced by the roll bonding treatment. A suitable way of effecting the cavity-forming separation of the aluminum structure along the areas which have been printed or otherwise defined by stop-weld material, is to apply fluid pressure, as through a communicating opening formed at a non-welded region which intersects an edge of the fabricated sheet. With introduction of the fluid under sufficiently high pressure, for example suitable liquid, the sheet walls of the selected non-bonded areas are expanded outwardly, or one such wall is so expanded if the other is suitably retained, so as to produce the desired hollow structure. Among articles which can be fabricated by this welding process are refrigerator evaporator panels, which are sheet-like structures that have internal systems of passageways.

In practice, the stop-weld material generally used in the above operations has been graphite, in finely divided form, compounded into an ink suitable for application to the selected areas of the aluminum sheet by a printing operation, conveniently by the silk screen process.

From the standpoint of possible corrosion of the fabricated article, graphite is one of the less desirable materials that have heretofore been considered for use in stop-weld inks of the welding process. Graphite is a strong cathode (or cathodic depolarizer) and under most conditions where corrosion of aluminum is a factor in subsequent use of the welded assemblies, the graphite tends to accelerate the electrochemical processes leading to corrosion of the metal. There is no practical way, so far as at present known, for removing graphite completely from the welded assemblies in which it has been used.

Other materials suggested as a base for stop-weld compositions have been less satisfactory than graphite or have been accompanied by similar or other difficulties, examples of such materials being various mineral substances which are similarly incapable of effective or complete removal from the interior of the fabrication.

Accordingly, an important object of the present invention is the provision, in and for the described operation of fabricating hollow articles by welding, of a novel stop-weld ink or composition which is free from the deficiencies noted above and which at the same time is effective to prevent cohesion of the aluminum sheets under the conditions of temperature and pressure at which the welding process is carried out.

Other objects are to provide an improved welding operation, yielding products of superior or more useful character, and to afford novel methods of making inks or the like for the application of stop-weld patterns in such operations. A further, special object is to avoid promotion, and indeed to afford inhibition, of corrosion in the internal passages of aluminum articles fabricated in the described manner.

To these and other ends the present invention embraces the provision of an ink or the like having satisfactory stop-weld and other properties, and having water-soluble characteristics, such that it is possible to remove substantially the whole of the coating or pattern by washing out the passages in the final article after inflation or expansion. In a more particular sense, the problems defined above have been solved, in accordance with the invention, by the employment in the welding process, of an ink which comprises a suitable vehicle, preferably having properties of water solubility, and which has satisfactory body or tack (i.e. tackiness) for printing on aluminum, and which carries as the stop-weld material a water soluble metallic salt of suitable character, viz. potassium chromate ($K_2CrO_4$), which is solid and stable at the temperatures and pressures at which the welding process is performed.

Potassium chromate, thus employed as the stop-weld material in accordance with the present invention, has a melting point of 760.3° C., which is higher than temperatures normally used in the welding operation as applied to aluminum. While not shearable in the way graphite is, it is highly frangible so that the coating or layer of it is in effect permitted to extend longitudinally along with the pattern during the rolling operation. That is, as the sheets are elongated in rolling, the particles of the salt are fractured so as to maintain an effective weld-preventing distribution throughout the selected areas. Potassium chromate, moreover, is water soluble and thus can be easily washed out of the expanded passages. Furthermore it is unusually suitable as the base or partitioning substance of a stop-weld composition in aluminum structures, since it is a strong corrosion inhibitor for aluminum. Thus any residues of potassium chromate which are not washed out have a corrosion inhibiting rather than a corrosion accelerating effect in the ultimate use of the roll bonded assemblies.

In accordance with a further feature of the invention, an effective composition, of a nature of an ink, for applying the stop-weld material to an aluminum surface, comprises a suspension of the potassium chromate in a liquid vehicle which also contains a bonding agent having the special property of maintaining the applied particles of potassium chromate in place as a coating until the roll bonding step is completed. The composition, including the potassium chromate in very finely divided form, should have sufficient body and preferably some tack, as to permit its application by printing and to insure its initial adherence to the aluminum metal surface. For such purposes an unusually satisfactory liquid is ethylene glycol, which tends to be removed by evaporation during the preheating stage of the welding process, and which in any event is water soluble.

In order to keep the particles of potassium chromate in place after the ethylene glycol has disappeared by volatilization during such preheating, boric acid has been discovered to be peculiarly appropriate. As the sheet is brought to an elevated temperature, e.g. during the preheating which evaporates the ethylene glycol, the boric acid is understood to be converted or reduced to a viscous boric oxide glass, which then serves as a binder for the potassium chromate, against dislodgment of the particles before the actual rolling operation has been completed. A relatively minor amount of the boric acid is sufficient for the described purpose. Boric acid, moreover, has the special advantage of being relatively non-corrosive to aluminum and being soluble in water, both in its original and in its boric oxide form, so that it can be easily washed out of the roll bonded fabrications, along with the potassium chromate.

Boric acid also appears to have a binding effect in advance of the described result of heating it; i.e. it promotes the retention of the imprinted composition when it crystallizes out as the ethylene glycol or other alcohol dries.

Thus a preferred ink composition consists of a paste-like mass, of appropriate consistency for silk screen printing or similar operation, which comprises a suspension of fine particles of potassium chromate in a body of ethylene glycol that contains, in solution, a minor proportion of boric acid. This composition is screenable, i.e. for application by the preferred printing method, and has sufficient body and tack so that it will appropriately wet or adhere to the areas on which it is imprinted. Furthermore, when the alcohol vehicle evaporates, especially as the high temperatures of preheating are reached, the binding effects of the boric acid, which is intermixed with the chromate particles, are realized, to keep the coating in place. Hence there is no risk of the fine particles being shaken off or out of the desired distribution along the selected areas, prior to the rolling step or steps. After such rolling, which welds the sheets together at all other regions, with corresponding reduction in thickness and elongation in linear dimension of the resulting sheet structure, the areas of the imprinted pattern can be expanded by fluid pressure, thus achieving the desired passage structure in the article. The residue of potassium chromate and boric oxide or acid, being all soluble in water, is then readily washed out of the cavities. Furthermore, to the extent that some potassium chromate may yet remain, e.g. as a slight coating or deposit, it has a positive anti-corrosive property for the interior surfaces.

A novel and unusually effective way of making the composition, including procedure for achieving the preferred fine subdivision of the potassium chromate as is necessary for silk screen printing, is essentially as follows: a slurry of potassium chromate in granular or other divided form in a hydrocarbon solvent, such as mineral spirits, kerosene, coal tar solvent naphtha, toluene, xylene, spirits of turpentine, or the like, is ground in a suitable mill, until the chromate is reduced to a desired fine particle size, e.g. substantially all as a powder finer than 325 mesh. The slurry is then thoroughly mixed with ethylene glycol, which may contain a minor proportion of boric acid dissolved therein (e.g. less than 10% by weight). The fine potassium chromate being insoluble in the hydrocarbon solvent and also essentially insoluble in ethylene glycol, is preferentially wetted by the latter, to the extent that it is in a sense precipitated from the hydrocarbon solvent and is thus collected by the ethylene glycol. The hydrocarbon solvent is then separated from the mass, as by decantation, with the aid of kneading or mixing to liberate such solvent from the paste-like composition of the glycol, and also, if necessary, with the aid of some elevation of temperature and further additions of ethylene glycol. Thus mostly by decantation and finally by some evaporation (of hydrocarbon), the ink product is established, consisting of a suspension of very finely ground potassium chromate in a solution of boric acid in ethylene glycol, at paste consistency. If desired for optimum requirements of silk screen printing, the paste can be thinned by further addition of ethylene glycol, i.e. to the necessary consistency.

It will be understood that for the desired printing operation, the mineral spirits or other hydrocarbon should be removed to the extent that it does not provide a barrier between the ink ingredients and the aluminum; in practice, essentially complete removal of the hydrocarbon is desired, for effective application and wetting of the metal surface with the ink.

In carrying out the improved operation of making hollow sheet metal fabrications, the desired pattern is first imprinted on one of the two aluminum sheets, with the described ink. Thereupon the second sheet is superimposed on the first, covering the pattern, and the composite structure is subjected to the preheating operation conventionally preliminary to the bonding step where hot rolling is used. From the preheating, which is carried to the desired rolling temperature (usually of the order of 300° C. and upwards), the composite assembly is subjected to one or more rolling passes, to achieve the desired reduction in thickness and the corresponding elongation, and most particularly to achieve the desired welding of the sheets. Finally, by providing an access opening at one edge, provision is made for the introduction of fluid under pressure to expand the structure along the areas which have been imprinted with the stop-weld material. Such expansion of the cavities completes the fabrication of the article with its intended system of integral-walled passages. The residue of the ink is then simply washed out of the passages with water.

Figure 2:
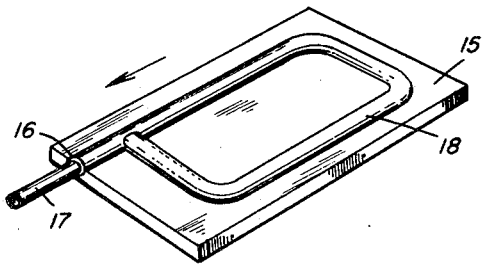

An example of certain stages of the process is shown, for further illustration, in the accompanying drawing, wherein:

FIG. 1 is an exploded perspective view of the two aluminum sheets to be sandwiched together, with the pattern of stop-weld material on the inner face of one of them; and FIG. 2 is a perspective view of the article rolled from the assembly of the sheets of FIG. 1, with the passage system expanded therein along areas determined by the imprinted pattern of FIG. 1.

In carrying out the illustrated example of the process, the pattern for the desired passageways is imprinted at 10 on the aluminum sheet 11, using the described potassium chromate ink. An aluminum sheet 12 of like area is then superposed on the sheet 11, so that the stop-weld pattern is sandwiched between them. It will be noted that the dimensions of the various parts of the pattern are selected so that upon elongation during rolling, the ultimate configuration and size of the pattern will correspond precisely with the desired configuration of passageways. In at least one region, e.g. as indicated at 13, the stop-weld pattern intersects an edge of the sheet 11, so as to provide a region to be preliminarily opened for application of a source of fluid under pressure.

After the two sheets 11 and 12 are brought together, with the pattern 10 between them at the selected areas, they may be conveniently retained as by tack welding at the edges. Thereupon the preheating and hot rolling steps are carried out, as in a manner which is known, at a suitably elevated temperature, the usual range of such temperatures being well below the melting point of potassium chromate. Assuming that the rolling is effected in the direction of the arrows in the figures, the resulting integrated elongated sheet 15 is shown in FIG. 2. During this operation, the imprinted pattern is likewise elongated or stretched, but the desired distribution of fine particles of chromate is maintained, sufficiently to prevent mutual welding of the sheets in the intended passage-forming areas. That is to say, under the rolling pressure, the frangible chromate tends to distribute itself by breaking into still smaller particles, thus maintaining the desired separation of the abutting aluminum surfaces.

At the edge region of the rolled sheet where the intersecting band 13 of stop-weld material occurs, a mechanical operation is performed to afford an expanded opening or mouth, as at 16 in FIG. 2, to receive an appropriate tube or like connection 17 for delivery of fluid pressure. The hydraulic or other fluid under high pressure thereafter expands the entire non-welded region, resulting in the internal tubular or passage structure indicated by the correspondingly raised parts or corrugations 18 in FIG. 2. Finally, the coating of potassium chromate, with its minor content of boric oxide, may be removed, or removed to the extent desired, by flushing out the passage system with water. It will be understood that details of the technique of assembling the sandwich of metal sheets, and of heating and rolling and subsequently expanding the passage system, are known in the art and need not be elaborated here.

In the manufacture of the ink composition, other procedures and alternative ingredients, than as here indicated to be preferable, may be employed in many cases, and likewise the proportions of ingredients can be considerably varied. Thus any of a number of hydrocarbon solvents may be employed in the grinding step, to facilitate the desired reduction to an extremely fine particle size (as for silk screen printing), yielding a slurry of chromate particles. Since these hydrocarbon liquids are not suitable for the printing operation and since it is desired to provide a paste-like suspension in a vehicle appropriate for such step, the further procedure of collecting the fine chromate from the hydrocarbon in ethylene glycol is followed.

Ethylene glycol is unusually suitable for this purpose and thus represents a specific feature of invention, but it is conceived that other liquids may be employed in some cases, e.g. other alcohols which are not miscible with hydrocarbon solvents such as mineral spirits and the like. It is preferable that the vehicle used for collecting the chromate particles from the hydrocarbon have (as does ethylene glycol) a boiling point below the preheating temperatures used in the welding process, for instance a boiling point no higher than about 250° C. at 760 mm. pressure. There is also some advantage, in avoiding difficulties of a highly volatile vehicle, if the alcohol is one which evaporates only slowly at room or ordinary temperatures, ethylene glycol being particularly desirable in these respects. The vehicle should also preferably have at least some solvent power for boric acid.

For this chromate-collecting and ink-forming vehicle, water solubility of the alcohol, e.g. ethylene glycol, is very advantageous even though the welding operation may be such that the liquid is evaporated away. For instance, if the sheet is erroneously or badly imprinted, it may simply be washed with water and then be re-subjected to the printing operation, all without any special cleaning or the like.

By way of specific example of the manufacture of a stop-weld ink, 200 parts by weight of granular potassium chromate are charged into a steel ball mill together with 300 parts by weight of a dry, light hydrocarbon, specifically mineral spirits. The mill is operated, i.e. grinding the potassium chromate in the hydrocarbon carrier, until the salt is reduced to an extremely fine powder, i.e. substantially all passing through 325 mesh. The resulting slurry of potassium chromate in mineral spirits is then washed out of the mill, using further amounts of the hydrocarbon solvent as necessary. The slurry is thereafter mixed with a solution consisting of 90 parts by weight of ethylene glycol and 7.5 parts by weight of boric acid dissolved in the glycol. On initial mixing of the hydrocarbon solvent slurry and the ethylene glycol vehicle, the potassium chromate is precipitated or collected in the ethylene glycol, so that a considerable amount of the hydrocarbon solvent can be decanted at once.

The mixture is then kneaded in suitable equipment, separating further quantities of hydrocarbon solvent, for removal by decantation. After such operation of the kneading equipment and further removal of mineral spirits as stated, the kneading can be continued at a somewhat elevated temperature (but below 100° C.), with some small further additions of ethylene glycol, until the last traces of the hydrocarbon solvent are eliminated by evaporation. The resulting mass is a paste-like suspension of the fine potassium chromate particles in ethylene glycol, the latter containing a small amount of boric acid. Upon adjustment of consistency, as by adding more ethylene glycol, if necessary, the paste constitutes an ink highly appropriate for application to aluminum surfaces by silk screening. The welding operation is then effected, in the manner described above, using the stated ink for imprint of the stop-weld pattern.

It will now be seen that an unusually effective improvement is provided in the roll bonding operation for fabrication of hollow sheet-metal assemblies. In such realization of the advantages of the improved ink, the properties of the metallic salt pigment, i.e. potassium chromate (or equivalent), that are necessary for the stop-weld function are: it does not melt or decompose at temperatures reached by the metal in or incidental to the rolling step; and it is sufficiently water soluble to be readily washed out at the end of the operation. Special and unusual advantages of the chromate as a stop-weld material are that it is not corrosive to aluminum, and indeed has a definite corrosion-inhibiting effect; and that it is frangible so that in the applied coating or layer it in effect extends itself uniformly when the underlying or adjacent metal surface is elongated by the deforming action of rolling.

Although as explained, boric acid has exceptional properties as a binding agent for the composition in the fabricating operations where hot rolling is used, alternative binding material may be employed in some cases. For instance, polyvinylpyrrolidone resin (abbreviated PVP) can be used in making a stop-weld ink with potassium chromate and ethylene glycol, the resulting composition being especially suitable for silk screen printing and having desirable tack and other characteristics for retention on the aluminum metal surface. The resin, however, tends to be destroyed at elevated temperatures, so that the applied coating or layer of chromate will be correspondingly deficient in binder and thus likely to be shaken out of place during and after the preheating stage of a hot rolling operation. Where the fabrication by welding the sheets at the non-separated areas can be effected by relatively low temperature rolling, e.g. cold rolling, an ink made with the stated resin is suitable.

An example of the manufacture of an ink with the resin binder is as follows: the mixture subjected to the grinding operation in the ball mill consists of 270 parts by weight of granular potassium chromate, 225 parts by weight of kerosene, mineral spirits or coal tar solvent naphtha and 4.5 parts by weight of polyvinylpyrrolidone resin. The procedure is as previously described; after grinding, the potassium chromate and PVP are collected from the hydrocarbon slurry by adding 60 parts by weight of ethylene glycol, with decantation and kneading of the dough-like mass. The result is a paste suspension of finely ground potassium chromate in a solution of PVP in ethylene glycol. Effective adherence of the ink, after silk screen printing, is readily achieved, and the whole composition has the desirable characteristic of solubility in water.

In some cases, mixtures of binding agents may be employed. As an example, 1200 parts by weight of potassium chromate, 24 parts by weight of PVP and 1800 parts by weight of mineral spirits are ground for about eight hours in a pebble mill. The potassium chromate and PVP are then collected with a solution of 45 parts by weight of boric acid in 540 parts by weight of ethylene glycol, separation of the mineral spirits being effected in the manner previously explained. This ink has highly satisfactory binding and other properties for silk screen printing, while the boric acid content affords binding action at high temperatures even though the PVP is lost.

It will now be seen that by virtue of this invention the manufacture of hollow articles is substantially improved, for example in avoiding the difficulties heretofore encountered in the use of graphite as stop-weld material. In the present process, the danger of corrosion of the internal surfaces of the aluminum passages is essentially avoided, providing a better and longer lived product. The material is easily removed from the passages, and as applied in the preferred ink form, has the further advantage of being readily removable at any stage, should occasion demand.

It is to be understood that the invention is not limited to the specific procedures and compositions hereinabove set forth, but may be carried out in other ways without departure from its spirit.

I claim:

1. In a method of making hollow aluminum sheet metal fabrications which comprises rolling together a pair of aluminum metal sheets for mutually welding said sheets throughout areas other than regions defined by a previously interposed pattern of separation material and thereafter expanding the assembled structure along the regions of the aforesaid pattern to form cavities between the sheets at said regions, the improvement which comprises interposing said pattern prior to said rolling operation by applying to at least one of the sheets, in covering relation to said regions to be prevented from welding, a layer of finely divided, solid, potassium chromate particles as stop-weld material, held in place in said divided, solid form, on application, by carrier material which leaves no water-insoluble residue after the rolling operation, and maintaining said potassium chromate in distribution in finely divided, solid form over said regions during said rolling operation.

2. In a method of making hollow sheet metal fabrications which comprises rolling together a pair of aluminum sheets for mutually welding said sheets throughout areas other than regions defined by a previously interposed pattern of separation material and thereafter expanding the assembled structure along the regions of the aforesaid pattern to form cavities between the sheets at said regions, the improvement which comprises interposing said pattern prior to said rolling operation by applying to at least one of the aluminum sheets, in covering relation to said regions to be prevented from welding, a layer of finely divided, solid, potassium chromate particles as stop-weld material, held in place in said divided, solid form, on application, by carrier material which consists chiefly of an alcohol and which leaves no water-insoluble residue after the rolling operation, and maintaining said potassium chromate in distribution in finely divided, solid form over said regions during said rolling operation.

3. In a method of making hollow sheet metal fabrications which comprises preheating and hot rolling together a pair of aluminum sheets for mutually welding said sheets throughout areas other than regions defined by a previously interposed pattern of separation material and thereafter expanding the assembled structure along the regions of the aforesaid pattern to form cavities between the sheets at said regions, the improvement which comprises interposing said pattern prior to said rolling operation by applying to at least one of the aluminum sheets, in covering relation to said regions to be prevented from welding, a layer of a composition consisting essentially of finely divided, solid potassium chromate as stop-weld material, and carrier material which holds said chromate in place, on application, in said divided, solid form and which consists chiefly of an alcohol and which leaves no water-insoluble residue after the rolling operation, then evaporating said alcohol during preheating of the sheets but maintaining said potassium chromate in distribution in finely divided, solid form over said regions during said rolling operation, and thereafter, following the aforesaid expansion of said regions defined by the pattern, removing potassium chromate from the expanded cavities with water.

4. In a method of making hollow sheet metal fabrications which comprises preheating and hot rolling together a pair of aluminum sheets for mutually welding said sheets throughout areas other than regions defined by a previously interposed pattern of separation material and thereafter expanding the assembled structure along the regions of the aforesaid pattern to form cavities between the sheets at said regions, the improvement which comprises interposing said pattern prior to said rolling operation by applying to at least one of the aluminum sheets, in covering relation to said regions to be prevented from welding, a layer of a composition consisting essentially of finely divided, solid, potassium chromate particles as stop-weld material and carrier material which holds said chromate in place, on application, in said divided, solid form, and which leaves no water-insoluble residue after the rolling operation, and which comprises binder material for the chromate, removable with water after the rolling operation, said potassium chromate being maintained in distribution in finely divided, solid form over said regions during said rolling operation, and thereafter, following the aforesaid expansion of said regions defined by the pattern, removing the residue of said composition from the expanded cavities with water.

5. In a method of making hollow sheet metal fabrications which comprises rolling together a pair of aluminum sheets for mutually welding said sheets throughout areas other than regions defined by a previously interposed pattern of separation material and thereafter expanding the assembled structure along the regions of the aforesaid pattern to form cavities between the sheets at said regions, the improvement which comprises interposing said pattern prior to said rolling operation by applying to at least one of the aluminum sheets, in covering relation to said regions to be prevented from welding, a layer of finely divided, solid, potassium chromate particles as stop-weld materials, held in place in said divided, solid form, on application, by carrier material which leaves no water-insoluble residue after the rolling operation and which includes boric acid as binder for the potassium chromate, and heating said aluminum sheets for said rolling operation, said heating being effective to convert the boric acid to a form maintaining the potassium chromate in distribution in finely divided, solid form over said regions of the aluminum sheet material during said rolling operation.

6. In a method of making hollow sheet metal fabrications which comprises rolling together a pair of aluminum sheets for mutually welding said sheets throughout areas other than regions defined by a previously interposed pattern of separation material and thereafter expanding the assembled structure along the regions of the aforesaid pattern to form cavities between the sheets at said regions, the improvement which comprises interposing said pattern prior to said rolling operation by applying to at least one of the aluminum sheets, in covering relation to said regions to be prevented from welding, a composition consisting essentially of an alcohol, finely divided potassium chromate as stop-weld material suspended in said alcohol and boric acid as binder for the potassium chromate, dissolved in said alcohol, heating said aluminum sheets for said rolling operation, said heating being effective to evaporate the alcohol and to convert the boric acid to a form binding the chromate to the aluminum sheet material, said boric acid binder maintaining said chromate in distribution over said regions, and thereafter, following the aforesaid expansion of said regions defined by the pattern, removing potassium chromate and boric acid binder from the expanded cavities with water.

7. In a method of making hollow aluminum sheet metal fabrications, the steps of imprinting on a sheet of aluminum metal a pattern defining desired cavities in the ultimate fabrication, said printing comprising applying to the sheet a layer of a composition consisting essentially of finely divided, solid, potassium chromate particles as stop-weld material, and carrier material which holds said chromate in place, on application, in said divided, solid form and which consists chiefly of an alcohol and which leaves no water-insoluble residue after the sheet is subjected to a rolling operation, thereafter applying another sheet of metal over the pattern-carrying surface of the first-mentioned sheet, rolling said sheets to weld them together along areas other than the regions defined by the imprinted pattern, while maintaining said potassium chromate in finely divided, solid form over said regions, and expanding the structure to form cavities between the sheets, along the regions of the pattern.

8. In a method of making hollow aluminum sheet metal fabrications, the steps of imprinting on a sheet of aluminum a pattern defining desired cavities in the ultimate fabrications, said printing comprising applying to the aluminum sheet a composition consisting essentially of finely divided potassium chromate as stop-weld material, ethylene glycol carrying said potassium chromate in suspension therein, and boric acid as binder for the potassium chromate, dissolved in the ethylene glycol, thereafter applying another sheet of aluminum over the pattern-carrying surface of the first-mentioned sheet, subjecting said sheets to hot rolling for welding same together along areas other than the regions defined by the imprinted pattern, expanding the structure to form cavities along the regions of the pattern by introducing fluid under pressure to said regions, and removing the residue of said composition from said cavities with water.

9. In a method of making a weld-preventing coating composition, the steps of grinding potassium chromate in liquid hydrocarbon solvent to comminute the chromate, treating the resulting slurry of chromate and hydrocarbon solvent with an alcohol which is immiscible with said hydrocarbon solvent, to remove the chromate from the slurry by collecting same in said alcohol, and separating said hydrocarbon solvent from the mixture of chromate and said alcohol.

10. In a method of making a weld-preventing coating composition, the steps of grinding potassium chromate in liquid hydrocarbon solvent to comminute the chromate to a particle size substantially all finer than 325 mesh, treating the resulting slurry of chromate and hydrocarbon solvent with ethylene glycol to remove the chromate from the slurry by collecting same in said ethylene glycol, and separating said hydrocarbon solvent from the mixture of chromate and ethylene glycol.

11. A method of making a weld-preventing coating composition, comprising grinding potassium chromate in liquid hydrocarbon solvent, to comminute the chromate, treating the resulting slurry of potassium chromate and hydrocarbon solvent with ethylene glycol to remove the chromate from the slurry by collecting same in the ethylene glycol, and separating the hydrocarbon solvent from the mixture of ethylene glycol and chromate by agitation and decantation, to produce an intimate mixture of fine particles of said potassium chromate with ethylene glycol as a vehicle for enabling application of the mixture as a coating on metal surfaces.

12. The method defined in claim 11 which includes incorporating boric acid in the ethylene glycol to produce said intimate mixture containing boric acid for binding the composition to a metal surface when applied thereto and heated.

13. A method of making a weld-preventing coating composition, comprising grinding potassium chromate in liquid hydrocarbon solvent, until the potassium chromate is substantially all finer than 325 mesh, treating the resulting slurry of potassium chromate and hydrocarbon solvent with ethylene glycol containing boric acid, to remove the said chromate from the slurry by collecting same in the ethylene glycol, removing the hydrocarbon solvent from the mixture of ethylene glycol, chromate and boric acid, said last-mentioned step including agitating the material to promote separation of said solvent from the mixture, to produce a fine suspension of said potassium chromate in a vehicle consisting essentially of ethylene glycol containing boric acid.

14. A weld-preventing coating composition consisting essentially of finely divided, solid, potassium chromate particles as a stop-weld material and carrier material which holds said chromate in place, on application, in said divided, solid form and which consists chiefly of ethylene glycol and which leaves no water-insoluble residue after the metal to which the composition is applied has been subjected to the rolling operation.

15. A weld-preventing coating composition consisting essentially of an alcohol, finely divided potassium chromate as a stop-weld material carried in said alcohol, and boric acid, to serve as a binder for the potassium chromate when the composition is applied on a metal surface and the metal is heated.

16. A water-soluble weld-inhibiting ink consisting essentially of a vehicle consisting essentially of ethylene glycol and boric acid dissolved therein, and finely divided potassium chromate having a particle size substantially all finer than 325 mesh, dispersed in said vehicle, said boric acid serving as a binder for said potassium chromate when the ink is applied on a metal surface and the metal is heated.

References Cited in the file of this patent

UNITED STATES PATENTS

| | | |
|---|---|---|
| 1,868,749 | Ingersoll | July 26, 1932 |
| 1,955,547 | Ingersoll | Apr. 17, 1934 |
| 2,109,010 | Ingersoll | Feb. 22, 1938 |
| 2,149,281 | De Stubner | Mar. 7, 1939 |
| 2,333,608 | Wenzel | Nov. 2, 1943 |
| 2,544,139 | Deyrup | Mar. 6, 1951 |
| 2,617,740 | Morris | Nov. 11, 1952 |
| 2,662,031 | Vogel et al. | Dec. 8, 1953 |
| 2,662,273 | Long | Dec. 15, 1953 |
| 2,723,205 | Gallup et al. | Nov. 8, 1955 |
| 2,772,180 | Neel | Nov. 27, 1956 |
| 2,845,695 | Grenell | Aug. 5, 1958 |
| 2,941,280 | Heuer | June 21, 1960 |

OTHER REFERENCES

Lesser: "Inks for Marking Glass and Other Vitreous Surfaces," American Ink Maker, September 1946 (page 73).

Merck Index of Chemicals and Drugs, 6th edition (1952), (page 776).